United States Patent
Wu (10) Patent No.: US 10,785,821 B2
(45) Date of Patent: Sep. 22, 2020

(54) DEVICE AND METHOD OF HANDLING A RESUME CAUSE IN A RADIO RESOURCE CONTROL MESSAGE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/407,190

(22) Filed: May 9, 2019

(65) Prior Publication Data

US 2019/0350033 A1 Nov. 14, 2019

Related U.S. Application Data

(60) Provisional application No. 62/669,358, filed on May 9, 2018.

(51) Int. Cl.
*H04W 76/27* (2018.01)

(52) U.S. Cl.
CPC .................................. *H04W 76/27* (2018.02)

(58) Field of Classification Search
None
See application file for complete search history.

(56) References Cited

U.S. PATENT DOCUMENTS

| 2017/0311290 A1* | 10/2017 | Adjakple | .............. | H04W 48/00 |
| 2019/0028860 A1* | 1/2019 | Futaki | ................... | H04W 76/20 |
| 2019/0045572 A1* | 2/2019 | Kim | ...................... | H04W 76/27 |
| 2019/0132889 A1* | 5/2019 | Kim | ...................... | H04W 76/10 |
| 2019/0200265 A1* | 6/2019 | Yu | .......................... | H04W 76/10 |
| 2019/0246318 A1* | 8/2019 | Kim | ...................... | H04W 76/19 |
| 2019/0268827 A1* | 8/2019 | Kim | ...................... | H04W 48/02 |
| 2019/0357295 A1* | 11/2019 | Kim | ...................... | H04L 5/0055 |
| 2020/0015112 A1* | 1/2020 | Kim | ...................... | H04W 48/02 |
| 2020/0053818 A1* | 2/2020 | Sillanpaa | .............. | H04W 60/02 |
| 2020/0120741 A1* | 4/2020 | Lindheimer | .......... | H04W 76/28 |
| 2020/0229263 A1* | 7/2020 | Rajadurai | ............. | H04W 12/12 |

OTHER PUBLICATIONS

Search Report dated Oct. 17, 2019 for EP application No. 19173534.9, pp. 1~5.

(Continued)

*Primary Examiner* — Otis L Thompson, Jr.
(74) *Attorney, Agent, or Firm* — Winston Hsu (57) ABSTRACT

A communication device for handling resume causes comprises at least one storage device; and at least one processing circuit coupled to the at least one storage device. The at least one storage device stores instructions, and the at least one processing circuit is configured to execute the instructions of: initiating a radio resource control (RRC) resume procedure for a non-access stratum (NAS) requested purpose and a RRC requested purpose; determining a resume cause in a RRC Resume Request message of the RRC resume procedure according to the NAS requested purpose instead of the RRC requested purpose; transmitting the RRC Resume Request message comprising the resume cause to a BS of the network; and receiving a RRC Resume message for responding to the RRC Resume Request message, from the BS.

5 Claims, 7 Drawing Sheets

(56) References Cited

OTHER PUBLICATIONS

ZTE, "Consideration on the Ran Area Update Procedure", 3GPP TSG RAN WG2#NR_AdHoc#2, R2-1706674, Jun. 27-29, 2017, Qingdao, China, XP051301174, pp. 1-3.
Ericsson, "CN area updating in RRC_Inactive", 3GPP TSG-RAN WG2 #NR AH1801, Tdoc R2-1800435, Jan. 22-26, 2018, Vancouver, Canada, XP051386178, pp. 1-5.
Ericsson, "Establishment causes for NR", 3GPP TSG-RAN WG2#101bis, Tdoc R2-1804713, Apr. 16-20, 2018, Sanya, China, XP051428427, pp. 1-5.
3GPP TS 38.331 V15.1.0 (Mar. 2018) Technical Specification 3rd Generation Partnership Project; Technical Specification Group Radio Access Network; NR; Radio Resource Control (RRC) protocol specification (Release 15), Mar. 2018.
3GPP TS 36.331 V15.1.0 (Mar. 2018) Technical Specification 3rd Generation Partnership Project; Technical Specification Group Radio Access Network; Evolved Universal Terrestrial Radio Access (E-UTRA); Radio Resource Control (RRC); Protocol specification (Release 15), Mar. 2018.
3GPP TS 38.300 V15.1.0 (Mar. 2018) Technical Specification 3rd Generation Partnership Project; Technical Specification Group Radio Access Network; NR; NR and NG-RAN Overall Description; Stage 2 (Release 15), Mar. 2018.

\* cited by examiner

| NAS requested purpose | Resume cause |
|---|---|
| emergency service (or emergency call) | Emergency |
| high priority access | highPriorityAccess |
| mobile terminating access | mt-Access |
| mobile originating signaling | mo-Signalling |
| mobile originating data | mo-Data |
| mobile originating voice | mo-Voice |

FIG. 6

| RRC requested purpose | Resume cause |
|---|---|
| Responding a RAN paging | rna-Update |
| Periodic RNA update (i.e., RNA update triggered by expiry of the periodic RNA update timer) | rna-Update |
| Normal RNA update (i.e., RNA update triggered by a change of a RNA) | rna-Update |
| RRC requested purpose | Resume cause |
| Responding a RAN paging | rna-Update |
| Periodic RNA update (i.e., RNA update triggered by expiry of the periodic RNA update timer) | periodic-RNA-Update |
| Normal RNA update (i.e., RNA update triggered by a change of a RNA) | rna-Update |

FIG. 7

DEVICE AND METHOD OF HANDLING A RESUME CAUSE IN A RADIO RESOURCE CONTROL MESSAGE

CROSS REFERENCE TO RELATED APPLICATIONS

This application claims the benefit of U.S. Provisional Application No. 62/669,358 filed on May 9, 2018, which is incorporated herein by reference.

BACKGROUND OF THE INVENTION

1. Field of the Invention

The present invention relates to a device and a method used in a wireless communication system, and more particularly, to a device and a method of handling a resume cause in a radio resource control message.

2. Description of the Prior Art

A new radio (NR) system, initiated by the third generation partnership project (3GPP), includes a new radio interface and a new radio network architecture that provides a high data rate, a low latency, packet optimization, and an improved system capacity and an improved coverage.

SUMMARY OF THE INVENTION

The present invention therefore provides a method and related communication device for handling a resume cause in a radio resource control (RRC) message to solve the abovementioned problem.

A communication device for handling a resume causes comprises at least one storage device; and at least one processing circuit coupled to the at least one storage device. The at least one storage device stores instructions, and the at least one processing circuit is configured to execute the instructions of: initiating a radio resource control (RRC) resume procedure for a non-access stratum (NAS) requested purpose and a RRC requested purpose; determining a resume cause in a RRC Resume Request message of the RRC resume procedure according to the NAS requested purpose instead of the RRC requested purpose; transmitting the RRC Resume Request message comprising the resume cause to a BS of the network; and receiving a RRC Resume message for responding to the RRC Resume Request message, from the BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
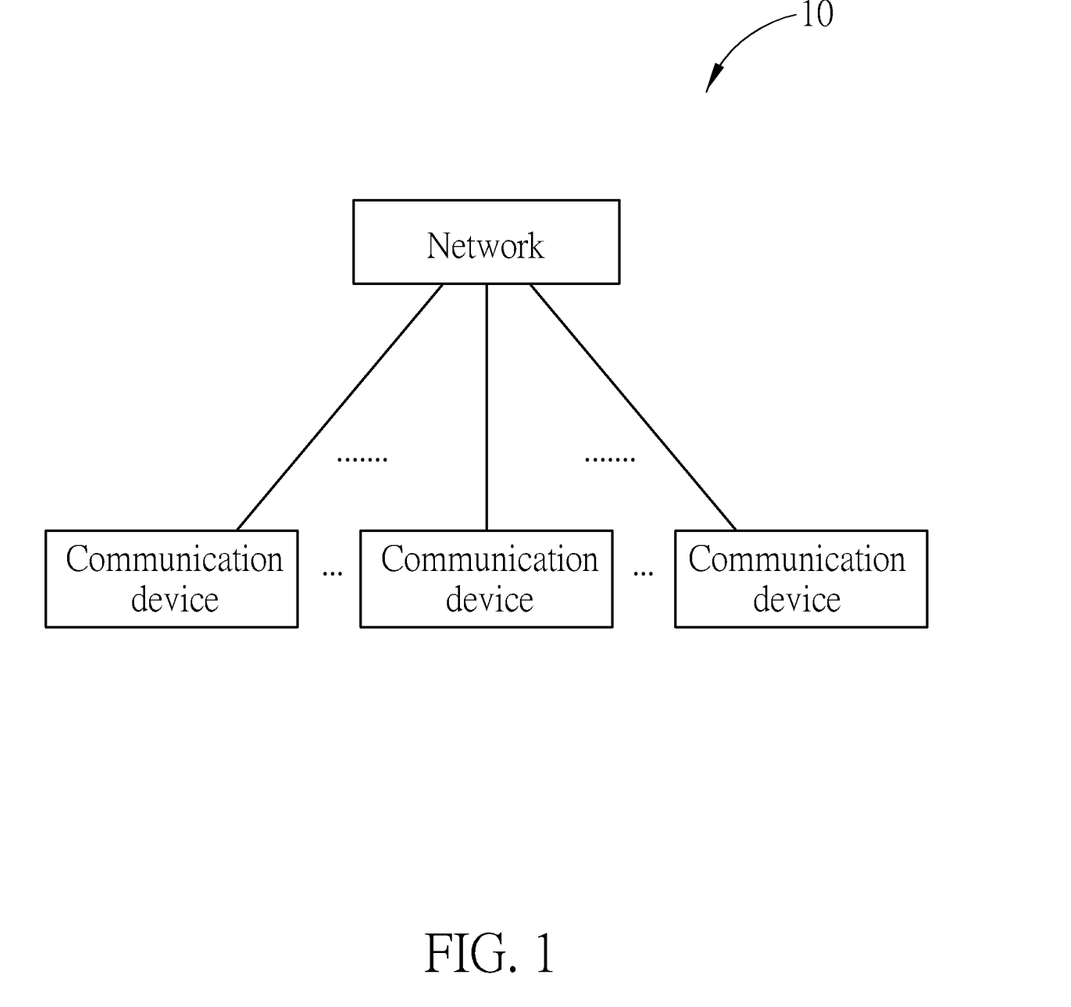
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. The network may include a 5G radio access network (RAN) and a fifth generation (5G) core (5GC). The 5G RAN may include at least one NR (NR) Node-B (gNB). The network may include a sixth generation (6G) RAN including a 6G base station (BS) and a 6G core (6GC) or the 5GC. The 6G BS performs a transmission and/or a reception of orthogonal frequency-division multiplexing (OFDM) symbols, filtered OFDM (F-OFDM) symbols, Generalized Frequency Division Multiplexing (GFDM) symbols, Universal Filtered MultiCarrier (UFMC) symbols or Filter Bank Multi-Carrier (FBMC) symbols.

Figure 2:
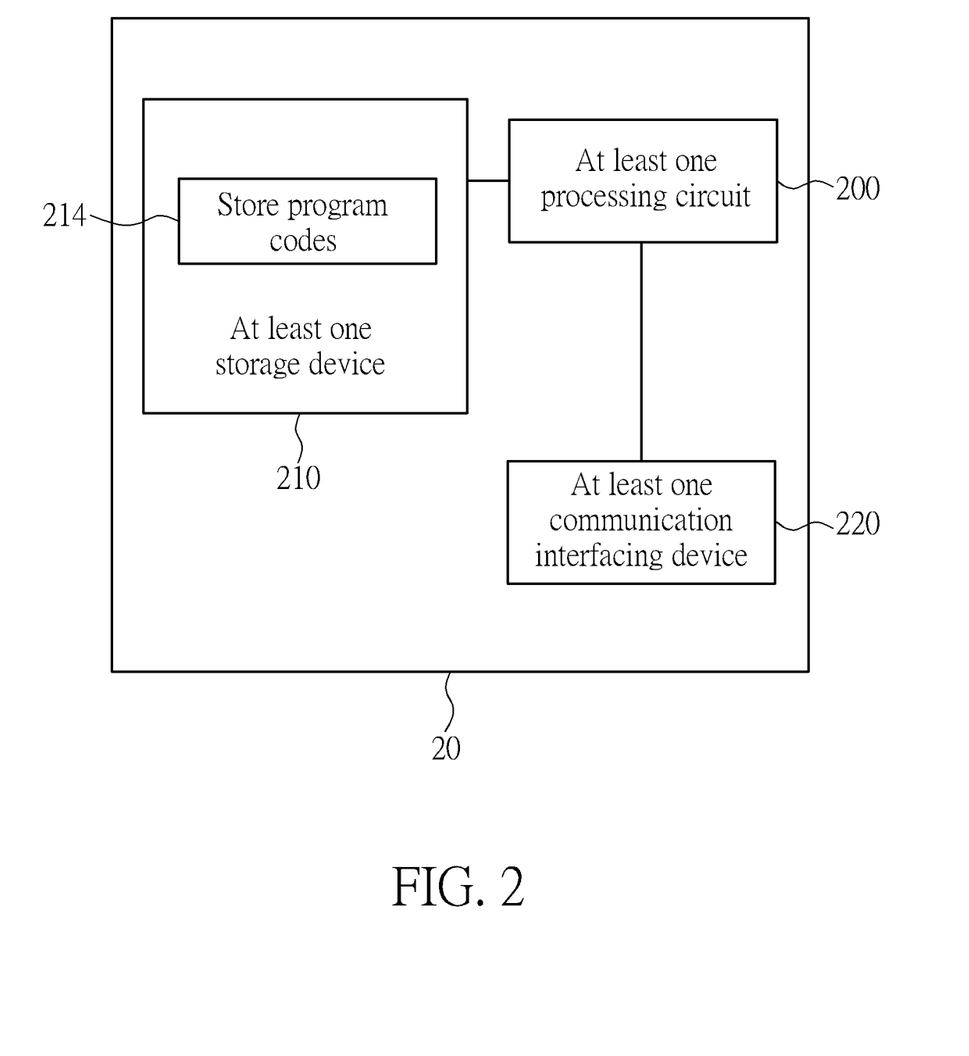
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device in FIG. 1, to simplify the illustration of the examples.

While a UE is in a RRC_INACTIVE state, a non-access stratum (NAS) layer of the UE may initiate a radio resource control (RRC) connection resume procedure (or called a RRC resume (RRCResume) procedure) for a NAS requested purpose. The NAS requested purpose is for performing (e.g., making) an emergency service, a high priority access, a mobile terminating access, a mobile originating signaling, a mobile originating data or a mobile originating voice. A RRC layer of the UE may initiate the RRC connection resume procedure for a RRC requested purpose. The RRC requested purpose is for responding to a next generation radio access network (NG-RAN) paging or performing a RAN notification area (RNA) update (e.g., due to an expiry of a periodic RNA update timer or a change of a RNA). The UE indicates the purpose using a resume cause in a RRC Resume Request (RRCResumeRequest) message. The UE transmits the RRCResumeRequest message to a BS (e.g., ng-eNB, gNB, enhanced gNB or sixth generation BS). The BS knows the purpose of the RRC connection resume procedure performed by the UE, and takes corresponding action(s). However, it is not known which resume cause should be set if the NAS layer requests the RRC layer to initiate the RRC connection resume procedure and at the same time the RRC layer is initiating the RRC connection resume procedure.

Figure 3:
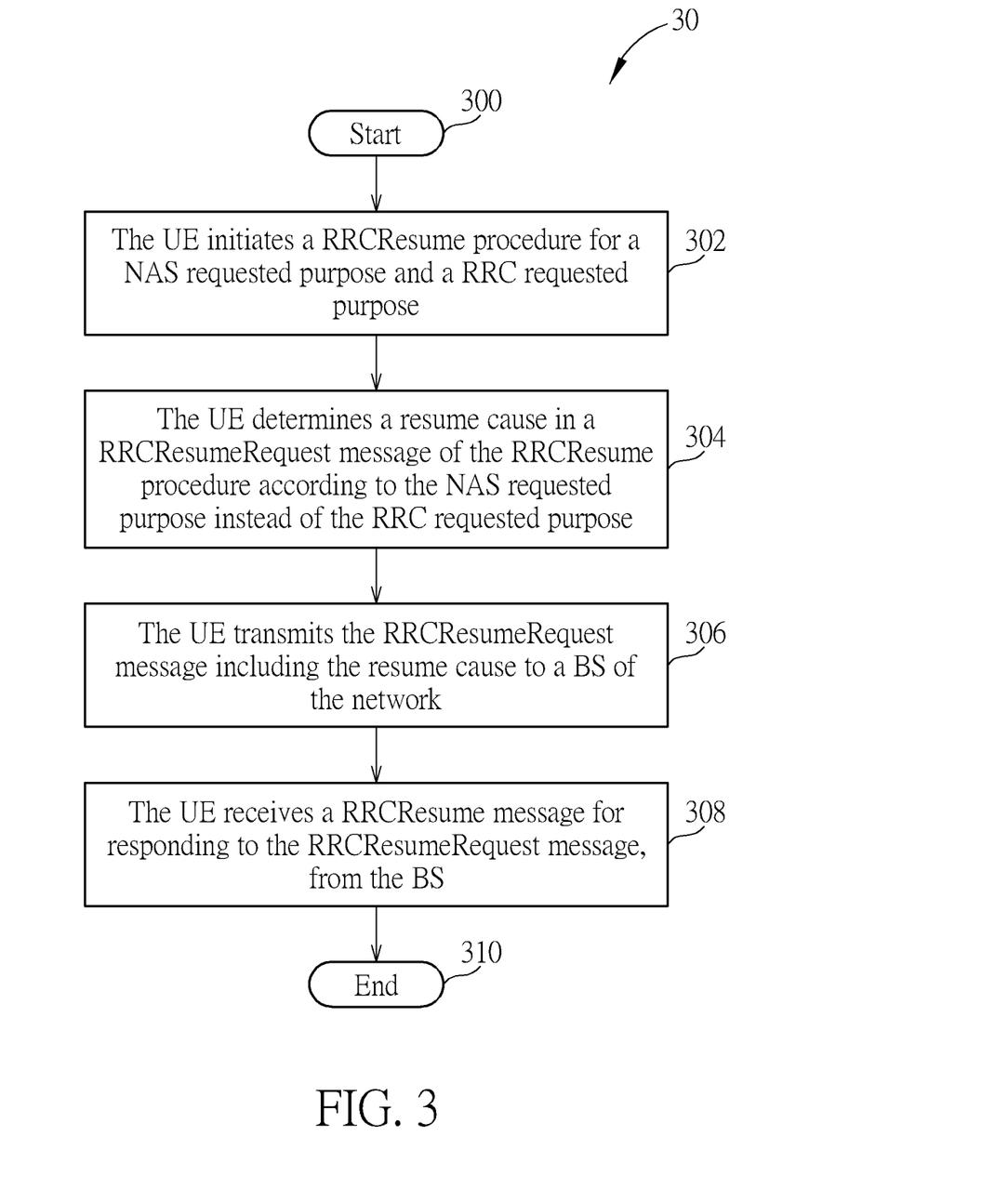
FIG. 3 is a flowchart of a process according to an example of the present invention.

A process 30 in FIG. 3 is utilized in a UE, and includes the following steps:

Step 300: Start.

Step 302: The UE initiates a RRCResume procedure for a NAS requested purpose and a RRC requested purpose.

Step 304: The UE determines (e.g., generates) a resume cause in a RRCResumeRequest message of the RRCResume procedure according to the NAS requested purpose instead of (e.g., without considering) the RRC requested purpose.

Step 306: The UE transmits the RRCResumeRequest message including the resume cause to a BS of a network.

Step 308: The UE receives a RRCResume message for responding to the RRCResumeRequest message, from the BS.

Step 310: End.

According to the process 30, when a NAS layer of the UE requests a RRC layer of the UE to initiate the RRC connection resume procedure for the NAS requested purpose and at the same time the RRC layer is initiating the RRC connection resume procedure for the RRC requested purpose, the UE sets the resume cause according to the NAS requested purpose instead of the RRC requested purpose. That is, the UE prioritizes the NAS requested purpose in a higher priority than the RRC requested purpose, when a NAS layer of requests the RRC layer to initiate the RRC connection resume procedure for the NAS requested purpose while the RRC layer is initiating the RRC connection resume procedure for the RRC requested purpose.

In one example, the UE determines (e.g., generates) the resume cause according to the RRC requested purpose, if the UE determines that the NAS requested purpose is barred according to a barring check. In this case, the UE may receive a RRC Release (RRCRelease) message for responding to the RRCResumeRequest message, from the BS.

In one example for Step 306, the UE transmits the RRCResumeRequest message including the resume cause to the BS of the network, if the UE passes a barring check for the NAS requested purpose. Otherwise, the UE does not transmit the RRCResumeRequest message.

Step 306 in the process 30 may be replaced by the following Step 306a:

Step 306a: The UE determines a resume cause in a RRCResumeRequest message of the RRCResume procedure according to the RRC requested purpose instead of the NAS requested purpose.

According to Step 306a, when the NAS layer requests the RRC layer to initiate the RRC connection resume procedure for the NAS requested purpose and at the same time the RRC layer is initiating the RRCResume procedure for the RRC requested purpose, the UE sets the resume cause according to the RRC requested purpose instead of the NAS requested purpose.

Figure 4:
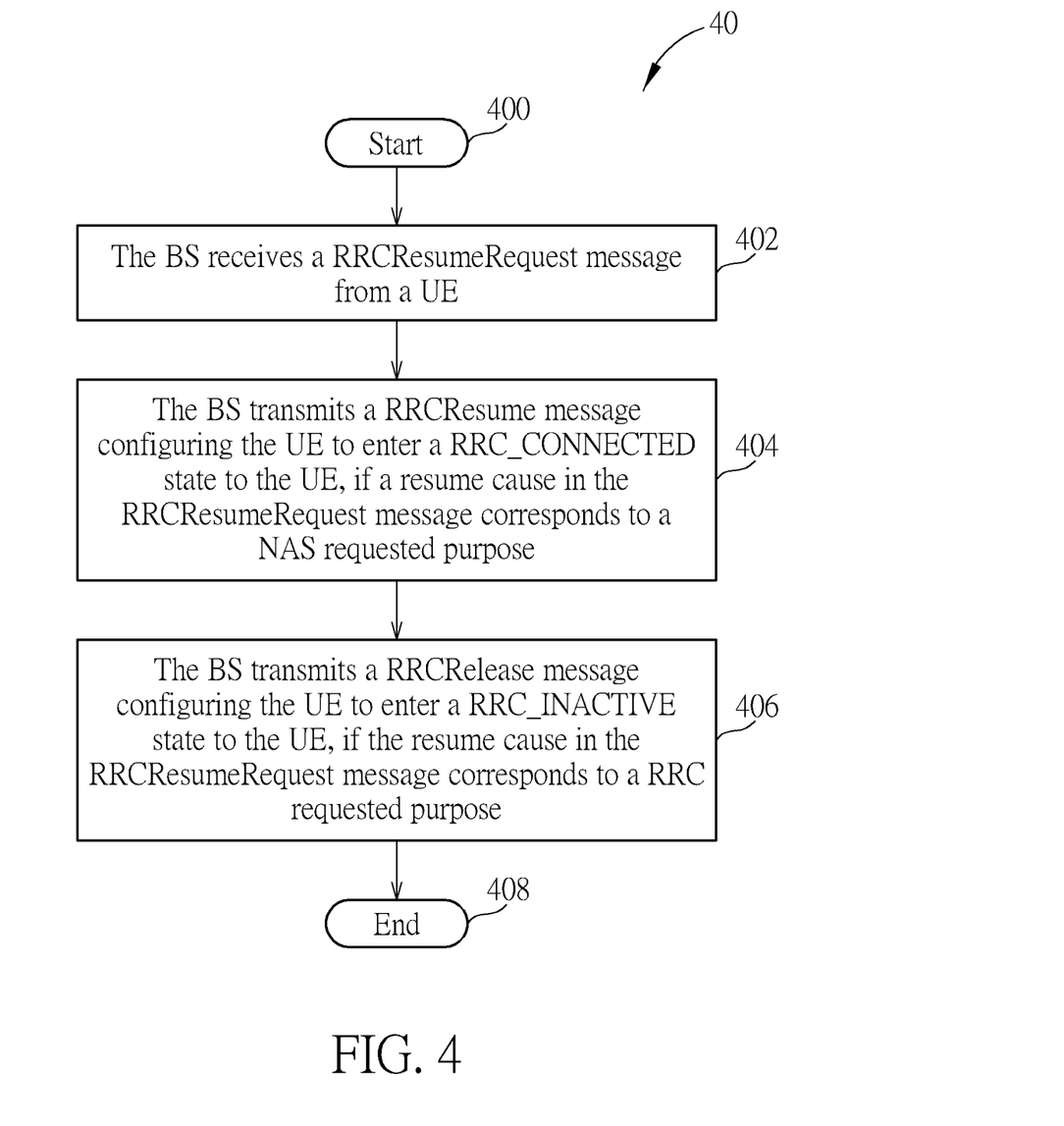
FIG. 4 is a flowchart of a process according to an example of the present invention.

A process 40 in FIG. 4 is utilized in a BS, and includes the following steps:

Step 400: Start.

Step 402: The BS receives a RRCResumeRequest message from a UE.

Step 404: The BS transmits a RRCResume message configuring the UE to enter a RRC_CONNECTED state to the UE, if (e.g., in response to that) a resume cause in the RRCResumeRequest message corresponds to a NAS requested purpose.

Step 406: The BS transmits a RRCRelease message configuring the UE to enter a RRC_INACTIVE state to the UE, if (e.g., in response to that) the resume cause in the RRCResumeRequest message corresponds to a RRC requested purpose.

Step 408: End.

Figure 5:
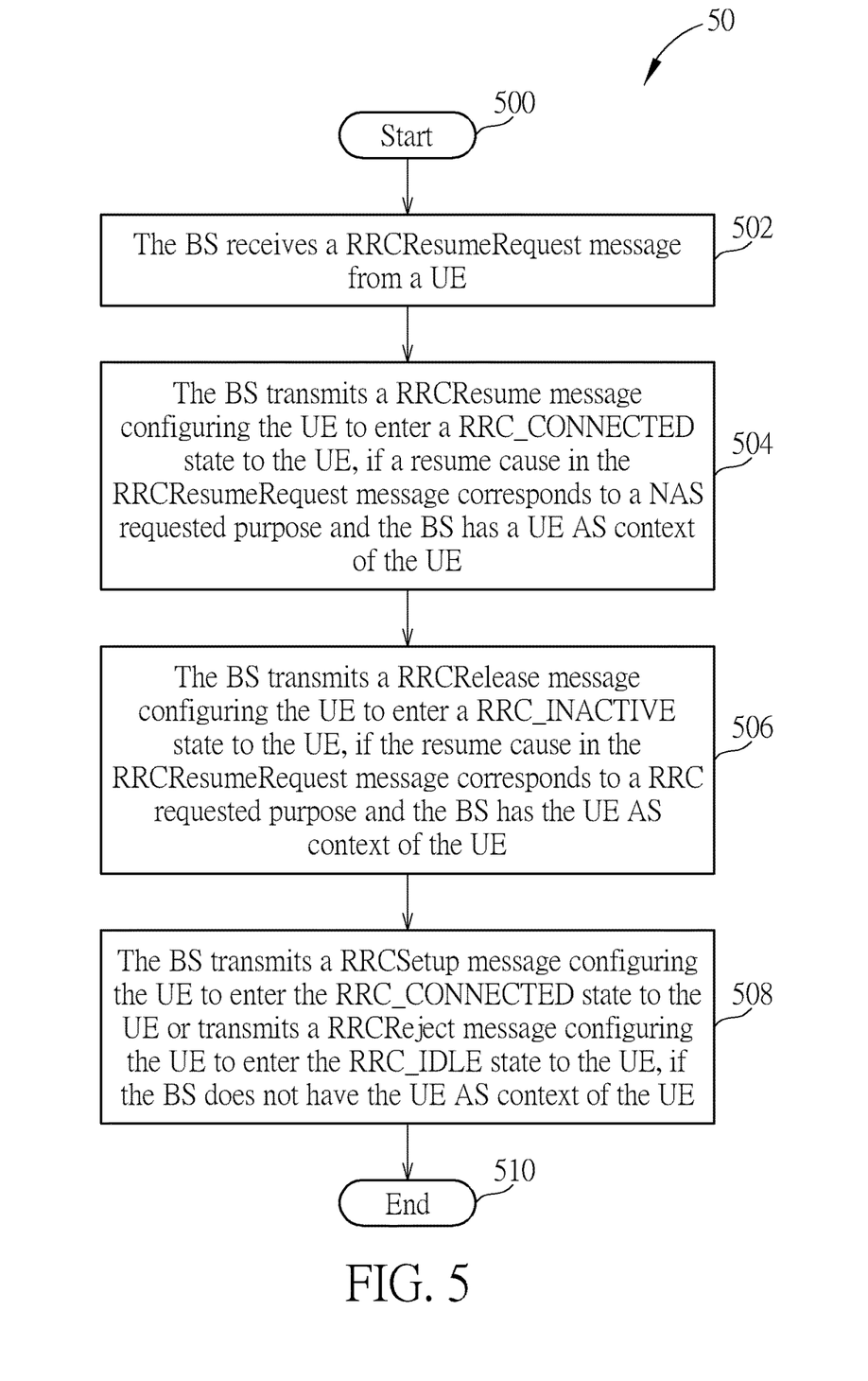
FIG. 5 is a flowchart of a process according to an example of the present invention.

A process 50 in FIG. 5 is utilized in a BS, and includes the following steps:

Step 500: Start.

Step 502: The BS receives a RRCResumeRequest message from a UE.

Step 504: The BS transmits a RRCResume message configuring the UE to enter a RRC_CONNECTED state to the UE, if (e.g., in response to that) a resume cause in the RRCResumeRequest message corresponds to a NAS requested purpose and the BS has a UE Access Stratum (AS) context of the UE.

Step 506: The BS transmits a RRCRelease message configuring the UE to enter a RRC_INACTIVE state to the UE, if (e.g., in response to that) the resume cause in the RRCResumeRequest message corresponds to a RRC requested purpose and the BS has the UE AS context of the UE.

Step 508: The BS transmits a RRC Setup (RRCSetup) message configuring the UE to enter the RRC_CONNECTED state to the UE or transmits a RRC Reject (RRCReject) message configuring the UE to enter the RRC_IDLE state to the UE, if (e.g., in response to that) the BS does not have the UE AS context of the UE.

Step 510: End.

The following examples may be applied to the above processes.

In one example, the UE enters the RRC_CONNECTED state from the RRC_INACTIVE state in response to the RRCResume message or the RRCSetup message. In one example, the UE stays in the RRC_INACTIVE in response to the RRCRelease message. In one example, the UE enters the RRC_IDLE state in response to the RRCReject message. In one example, the UE resumes a signaling radio bearer 2 (SRB2) and/or a data radio bearer (DRB) configured in the UE AS context, in response to the RRCResume message. In one example, the UE releases the UE AS context in response to the RRCSetup message or the RRCReject message. In one example, the UE stores/keeps/maintains the UE AS context in response to the RRCRelease message. In one example, if the RRCRelease message updates one or more configuration(s) in the UE AS context, the UE updates the one or more configuration(s) in the UE AS context accordingly.

In one example, the NAS requested purpose is for performing (e.g., making) an emergency service (or emergency call), a high priority access, a mobile terminating access, a mobile originating signaling, a mobile originating data or a mobile originating voice. The UE sets the resume cause corresponding to the NAS requested purpose, if the UE determines the resume cause in the RRCResumeRequest message according to the NAS requested purpose.

In one example, the RRC requested purpose is for responding to a RAN paging. The UE sets the resume cause corresponding to the RRC requested purpose, if the UE determines the resume cause in the RRCResumeRequest message according to the RRC requested purpose.

In one example, the UE initiates a RRCResume procedure for a first NAS requested purpose and a second NAS requested purpose. That is, the NAS layer of the UE requests the RRC layer of the UE to initiate the RRCResume procedure for two NAS requested purposes while the UE is in the RRC_INACTIVE. The UE determines a resume cause in a RRCResumeRequest message of the RRCResume procedure according to the first NAS requested purpose instead of the second NAS requested purpose. In one example, the first NAS requested purpose is for performing an emergency service, and the second NAS requested purpose is for performing a mobile originating signaling. In one example, the first NAS requested purpose is for performing a mobile originating signaling, and the second NAS requested purpose is for performing a mobile originating data. In one example, the first NAS requested purpose is for performing a mobile terminating access, and the second NAS requested purpose is for performing a mobile originating data. In one example, the first NAS requested purpose is for performing a high priority access, and the second NAS requested purpose is for performing a mobile originating data.

In one example, the UE initiates a RRCResume procedure for a first RRC requested purpose and a second RRC requested purpose. The UE determines a resume cause in a RRCResumeRequest message of the RRCResume procedure according to the first RRC requested purpose instead of the second RRC requested purpose. In one example, the first RRC requested purpose is for responding to a RAN paging, and the second RRC requested purpose is for performing a RAN notification area (RNA) update. That is, the UE is initiating the RRCResume procedure due to receiving the RAN paging and at the same time the UE changes a RNA. In one example, the first RRC requested purpose is for performing a RNA update due to a change of a RNA, and the second NAS requested purpose is for performing a RNA update due to an expiry of a periodic RNA update timer. That is, the UE is initiating the RRCResume procedure due to a change of a RNA and at the same time the periodic RAN update timer expires.

In one example, the UE performs Step 306a instead of Step 306, if the RRC requested purpose is for responding to a RAN paging and the NAS requested purpose is for performing a mobile originating data. The UE may perform Step 306a instead of Step 306, if the RRC requested purpose is for responding to a RAN paging and the NAS requested purpose is for performing a mobile originating signaling. The UE may perform Step 306a instead of Step 306, if the RRC requested purpose is for responding to a RAN paging and the NAS requested purpose is for performing a mobile originating voice. If none of the conditions above is met, the UE performs Step 306 instead of Step 306a.

Figure 6:
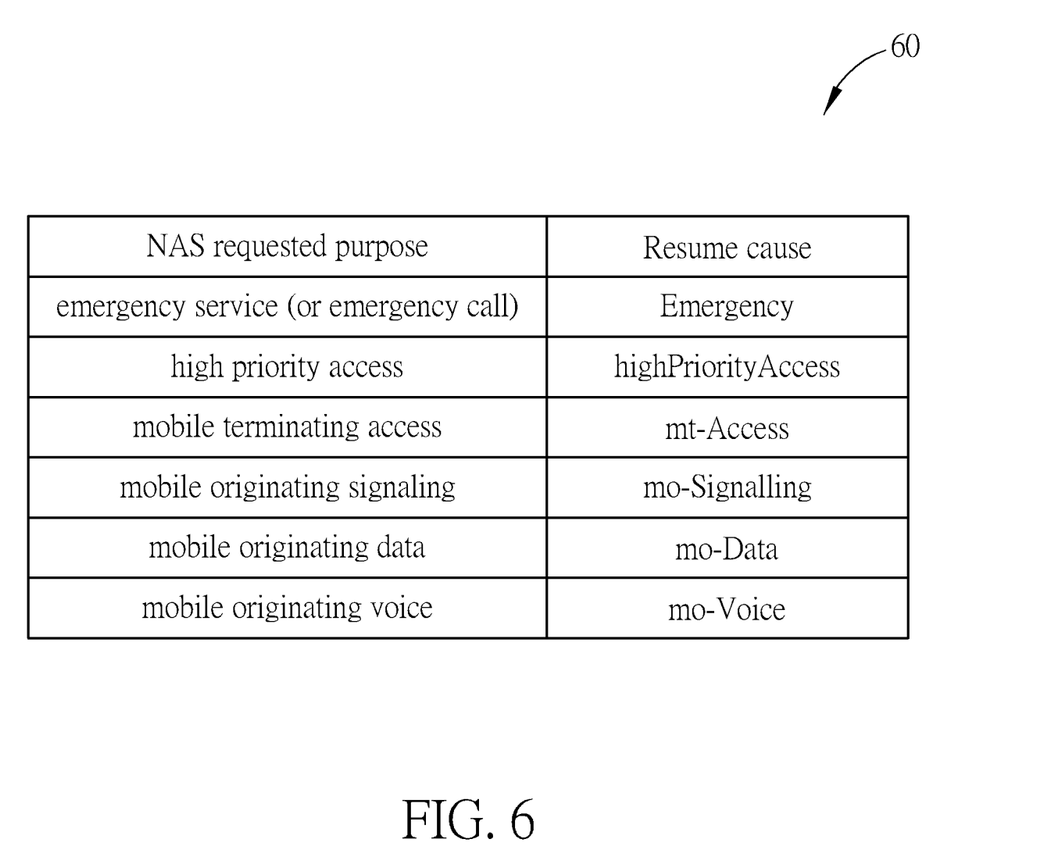
FIG. 6 is a table of a correspondence between resume causes and purposes according to an example of the present invention.

FIG. 6 is a table 60 of a correspondence between resume causes and purposes according to an example of the present invention. The correspondence (e.g., mapping) between the resume cause and the NAS requested purpose is shown in the table 60.

Figure 7:
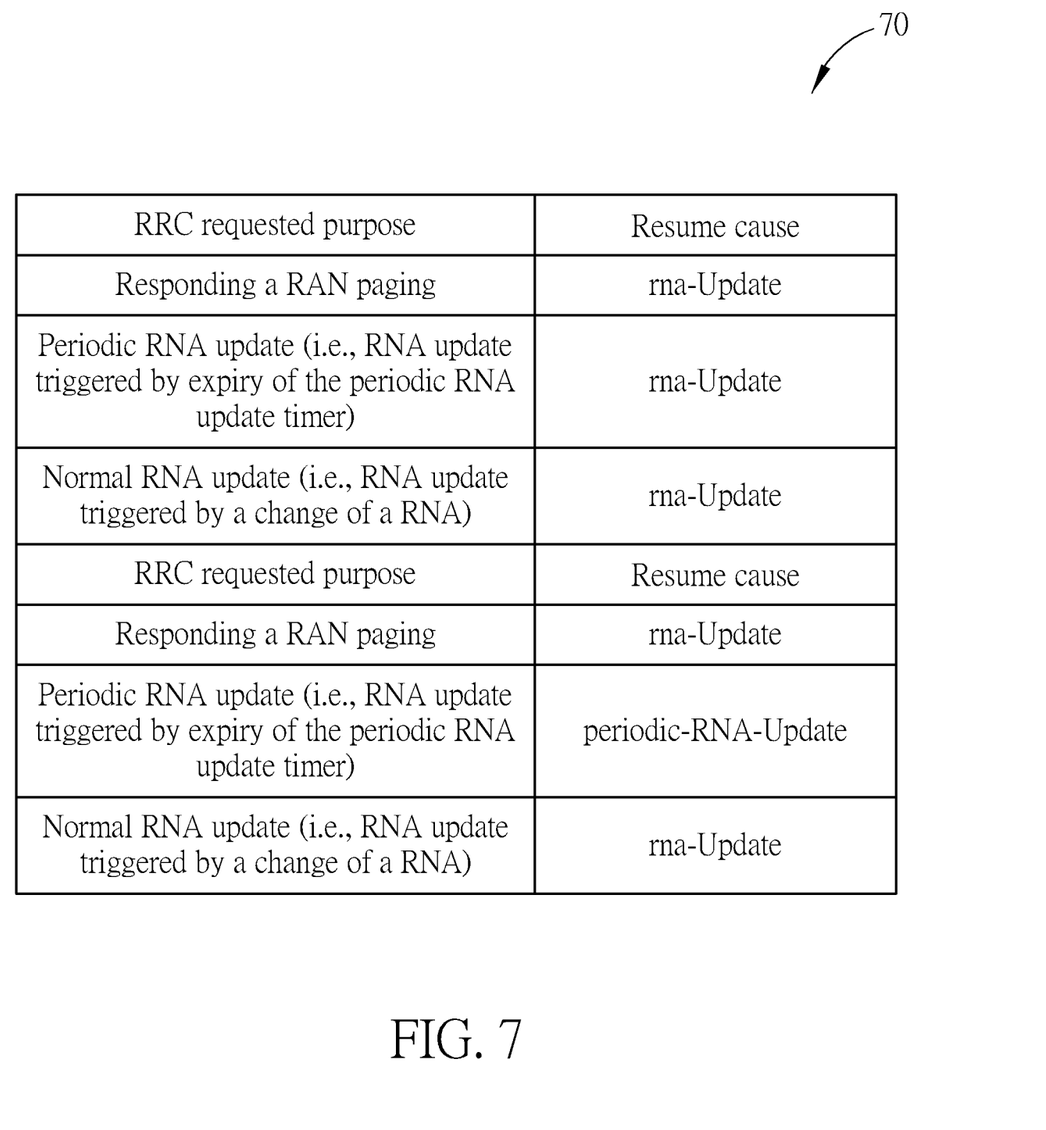
FIG. 7 is a table of a correspondence between resume causes and purposes according to an example of the present invention.

FIG. 7 is a table 70 of a correspondence between resume causes and purposes according to an example of the present invention. The correspondence (e.g., mapping) between the resume cause and the RRC requested purpose is shown in the table 70.

In one example, the UE generates the RRCResumeRequest message including the resume cause but does not transmit the RRCResumeRequest according to a result of the barring check. In on example, the UE updates the resume cause in the RRCResumeRequest message according to the above process, and transmits the RRCResumeRequest message including the updated resume cause after passing the barring check (i.e., the barring condition is no longer held). In on example, the UE generates a new RRCResumeRequest message including a new resume cause determined according to the above process, and transmits the new RRCResumeRequest message after passing the barring check.

In one example, the barring check is an access barring check based on at least one of an access class, an access category or a barring configuration. The BS may broadcast system information including the barring configuration, and the UE may receive the barring configuration in the system information.

In one example, the UE AS context includes at least one of a RRC configuration, a security context, a packet data convergence protocol (PDCP) state including a robust header compression (ROHC) state, a Cell Radio Network Temporary Identifier (C-RNTI) for a source primary cell (PCell), a cell identity or a physical cell identity of the source PCell. In one example, the RRC configuration includes at least one of an inactive RNTI (I-RNTI), CellGroupConfig(s), a radio bearer configuration (RadioBearerConfig) or a measurement configuration (MeasConfig). In one example, the CellGroupConfig(s) include the MCG CellGroupConfig(s). In one example, the CellGroupConfig(s) may further include a SCG CellGroupConfig. In one example, the RadioBearerConfig includes SRB configuration(s) configuring a SRB1 and/or SRB2, and/or includes DRB configuration(s) configuring DRB(s).

In one example, a CellGroupConfig includes at least one of RLC Bearer Configuration(s) (RLC-Bearer-Config(s)), a MAC Cell Group Configuration (MAC-CellGroupConfig), a physical cell group configuration (PhysicalCellGroupConfig), a special cell configuration (SpCellConfig) or a secondary cell (SCell) configuration.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, examples for a RAN or a RAN node can be made from the examples for the UE, and vice versa. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a resume cause in a RRC message. The communication device knows how to set the resume cause when a RRC connection resume procedure of the RRC message is initiated by both a NAS layer and a RRC layer of the communication device. Thus, the communication device can communicate with a BS regularly without ambiguity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a resume cause in a radio resource control (RRC) message, comprising:
   at least one storage device; and
   at least one processing circuit, coupled to the at least one storage device, wherein the at least one storage device stores instructions, and the at least one processing circuit is configured to execute the instructions of:
   initiating a RRC resume procedure for a non-access stratum (NAS) requested purpose and a RRC requested purpose, wherein the NAS requested purpose is for performing an emergency service, a high priority access, a mobile terminating access, a mobile originating signaling, a mobile originating data or a mobile originating voice, and the RRC requested purpose is for performing a radio access network (RAN) notification area (RNA) update or for responding to a RAN paging;
   determining a resume cause in a RRC Resume Request message of the RRC resume procedure according to the RRC requested purpose instead of the NAS requested purpose;
   determining the resume cause in the RRC Resume Request message of the RRC resume procedure according to the RRC requested purpose instead of the NAS requested purpose, if one of the following condition is satisfied:
      the RRC requested purpose is for responding to a RAN paging, and the NAS requested purpose is for performing a mobile originating data;
      the RRC requested purpose is for responding to the RAN paging, and the NAS requested purpose is for performing a mobile originating signaling; and
      the RRC requested purpose is for responding to the RAN paging, and the NAS requested purpose is for performing a mobile originating voice;
   transmitting the RRC Resume Request message comprising the resume cause to a base station (BS) of a network; and
   receiving a RRC Resume message for responding to the RRC Resume Request message, from the BS.

2. The communication device of claim 1, wherein the instructions further comprise:
   entering a RRC_CONNECTED state from a RRC_INACTIVE state in response to the RRC Resume message.

3. The communication device of claim 1, wherein the instructions further comprise:
   resuming at least one of a signaling radio bearer 2 (SRB2) or a data radio bearer (DRB) configured in a user equipment (UE) Access Stratum (AS) context, in response to the RRC Resume message.

4. The communication device of claim 3, wherein the UE AS context comprises at least one of a RRC configuration, a security context, a packet data convergence protocol (PDCP) state comprising a robust header compression (ROHC) state, a Cell Radio Network Temporary Identifier (C-RNTI) for a source primary cell (PCell), a cell identity or a physical cell identity of the source PCell.

5. A base station (BS) for handling a resume cause in a radio resource control (RRC) message, comprising:
   at least one storage device; and
   at least one processing circuit, coupled to the at least one storage device, wherein the at least one storage device stores instructions, and the at least one processing circuit is configured to execute the instructions of:
   receiving a RRC Resume Request message from a communication device;
   transmitting a RRC Resume message configuring the communication device to enter a RRC_CONNECTED state to the communication device, if a resume cause in the RRC Resume Request message corresponds to a non-access stratum (NAS) requested purpose, wherein the NAS requested purpose is for performing an emergency service, a high priority access, a mobile terminating access, a mobile originating signaling, a mobile originating data or a mobile originating voice; and
   transmitting a RRC Release message configuring the communication device to enter a RRC_INACTIVE state to the communication device, if the resume cause in the RRC Resume Request message corresponds to a RRC requested purpose, wherein the RRC requested purpose is for performing a radio access network (RAN) notification area (RNA) update.

* * * * *